United States Patent [19]
Martin et al.

[11] Patent Number: 5,438,322
[45] Date of Patent: Aug. 1, 1995

[54] THERMAL SENSOR FOR DETECTION OF POTENTIAL MECHANICAL FAILURES AND TRANSMISSION OF TEMPERATURE WARNING SIGNALS

[75] Inventors: James M. Martin, Williamson; Kenton H. Barker, Penfield; Salvatore D. DiRaimo, Ilion, all of N.Y.

[73] Assignee: General Railway Signal Corporation, Rochester, N.Y.

[21] Appl. No.: 257,637

[22] Filed: Jun. 9, 1994

[51] Int. Cl.[6] .............................................. G08B 17/06
[52] U.S. Cl. ................................ 340/584; 246/169 A; 340/449; 340/682
[58] Field of Search ............... 340/584, 590, 591, 592, 340/682, 447, 449; 246/169 A

[56] References Cited
U.S. PATENT DOCUMENTS
4,812,826  3/1989  Kaufman et al. .................... 340/592

*Primary Examiner*—Glen Swann
*Attorney, Agent, or Firm*—Ohlandt, Greeley, Ruggiero & Perle

[57] ABSTRACT

A frequency generating circuit and a cap-freeing mechanism in a bolt are responsive to a longitudinal movement of a piston in response to overheating of an associated bearing. The cap-freeing mechanism transfers a force from the piston to a cap, thereby freeing the cap from a head portion of the bolt and allowing an antenna to extend to the outside of the bolt. The frequency generating circuit is activated by a connection made between a switch and a battery of the circuit by the piston. Upon becoming activated, the frequency generating circuit sends a predetermined frequency or frequency pattern through the antenna.

15 Claims, 3 Drawing Sheets

THERMAL SENSOR FOR DETECTION OF POTENTIAL MECHANICAL FAILURES AND TRANSMISSION OF TEMPERATURE WARNING SIGNALS

BACKGROUND OF THE INVENTION

1. Field of the Invention

The present invention relates generally to thermal sensors that detect the failure of mechanical devices when a predetermined temperature has been reached. More particularly, the present invention relates to thermal warning indicator that is used in place of an ordinary bolt of a railroad car bearing to indicate when the temperature of the beating has reached a level indicative of potential failure in the beating.

2. Description of the Prior Art

Warning devices are typically used to indicate a condition when a railroad car beating has exceeded a predetermined threshold temperature. This predetermined temperature is indicative of an approaching bearing failure. Such a warning device is necessary for the identification of bearing problems in order to avoid undesirable results, such as a train derailment. Responsive to such necessity, various warning devices have been proposed for detecting impending trouble of bearings before actual axle failure occurs. A detailed discussion of the background of such warning devices may be found in U.S. Pat. No. 4,812,826 to Kaufman, et al., issued Mar. 14, 1989.

It is known in the prior art that specially adapted bolts that are capable of indicating a warning condition may be used in place of the standard bolts for securing a bearing assembly. These special bolts can determine when a railroad car bearing reaches a predetermined threshold temperature, and indicate the overheating condition to a train crew in time to prevent potential problems. For example, the aforementioned U.S. Pat. No. 4,812,826 to Kaufman et al, provides a thermal sensor bolt having an electronic module that produces a warning signal. The module consists of a battery, switch, modulator, oscillator, and antenna that are combined to emit a radio frequency signal when the antenna moves through the middle of the module. When the thermal sensor bolt reaches a certain temperature, the antenna is moved, thus alerting a train crew to the possibility of a problem with the bearing.

One major problem with implementing a frequency generating module in standard axle cap bolt is the extreme sensitivity of electronic components to heat. In an environment where warning sensors are utilized, the temperature can rise as much as 250 degrees to 350 degrees Celsius. Not only do electronic components, such as modulators, oscillator and energy source, require a way to dissipate heat in order to function properly and reliably, but they must be shielded from extreme heat levels. Therefore, designing a warning device having a properly functioning frequency generating module has proven to be quite difficult.

A further problem concerns the switch mechanism that initiates the frequency generating operation of the module. Due to the harsh environment, and the high shock and vibration of train car bearings combined with the high temperature conditions, the switch mechanism must be solid and yet simple so as to remain reliable. In addition, the switch mechanism must be small and inexpensive such that their manufacture does not involve burdensome costs. Moreover, switch contact must be established only when the transmitter is intended to operate. Such switch mechanisms, like the frequency generating modules, have been difficult to implement in warning devices.

Accordingly, the present invention, unlike the prior art, recognizes these problems associated with frequency generating modules and energy sources in warning devices, particularly those envisioned for operation within standard axle cap bolts, and overcomes these problems without sacrificing reliability and undue material and assembly costs.

It is an object of the present invention to provide thermal sensor having a frequency generating means that is exposed to the least amount of heat possible under standard operating conditions.

It is another object of the present invention to provide a thermal sensor having a heat insulating element shielding the frequency generating means, including the energy source, from external heat emanating from the bearing assembly.

It is still another object of the present invention to provide a solid and reliable switch mechanism to activate the frequency generating means.

SUMMARY OF THE INVENTION

In fulfillment of the above stated objects, and in accordance with the present invention, a temperature warning sensor is provided that detects a high temperature condition and indicates that problem condition with an active warning signal. Upon detection of the high temperature condition, an antenna is extended to the outside of the sensor in order to maximize the range and power of the warning signal. Thereafter, a warning signal of a predetermined frequency is transmitted through the antenna so that a receiving unit operated may pickup the warning and alert a train crew in time to avoid, for example, a bearing failure problem.

The warning device of the present invention substantially reduces the temperature to which the electronic components of the frequency generating module are exposed. The amount of heat exposed to the electronic components is minimal due to the particular location of the components and the heat insulation provided within the warning device. Therefore, the frequency generating module in the warning device of the present invention functions properly and reliably in high temperature conditions.

The warning device of the present invention further includes a solid and reliable switch mechanism that can withstand the harsh environment and sudden lurches of train car bearings as well as the high temperature conditions already explained. Furthermore, the switch mechanism is small enough to fit within a standard bolt and inexpensive to manufacture. Therefore, the switch mechanism of the present invention can initiate the frequency generating operation with optimal results.

In a preferred embodiment, a thermal sensor for detection of bearing failures comprising a bolt having a head at one end and having a second end, the bolt having a bore extending through the head to a point adjacent the second end; a piston situated in the bore; a communication system enclosed within the bore, the system including a transmitter circuit, an antenna and an energy source; a housing enclosing the energy source, the energy source being disposed between the transmitter circuit and the piston; and means, responsive to an elevated temperature indicative of bearing failure, for moving the piston towards the head of the bolt such that the antenna protrudes from the head of the bolt and the communication system is turned on.

The preferred embodiment of the present invention further comprises a switch arm adjacent to said energy source in which the movement of said piston is such that one end of said piston contacts both said one end of said energy source and said switch arm to connect said energy source to said transmitter circuit.

The above, and other objects, features and advantages of the present invention will become apparent from the following description read in conjunction with the accompanying drawings, in which like reference numerals designate the same elements.

BRIEF DESCRIPTION OF THE DRAWINGS

The foregoing and other objects and advantages of the present invention will be more apparent from the following detailed explanation of the preferred embodiments of the invention in connection with the accompanying drawings wherein.

DETAILED DESCRIPTION OF THE PREFERRED EMBODIMENT

Figure 1:
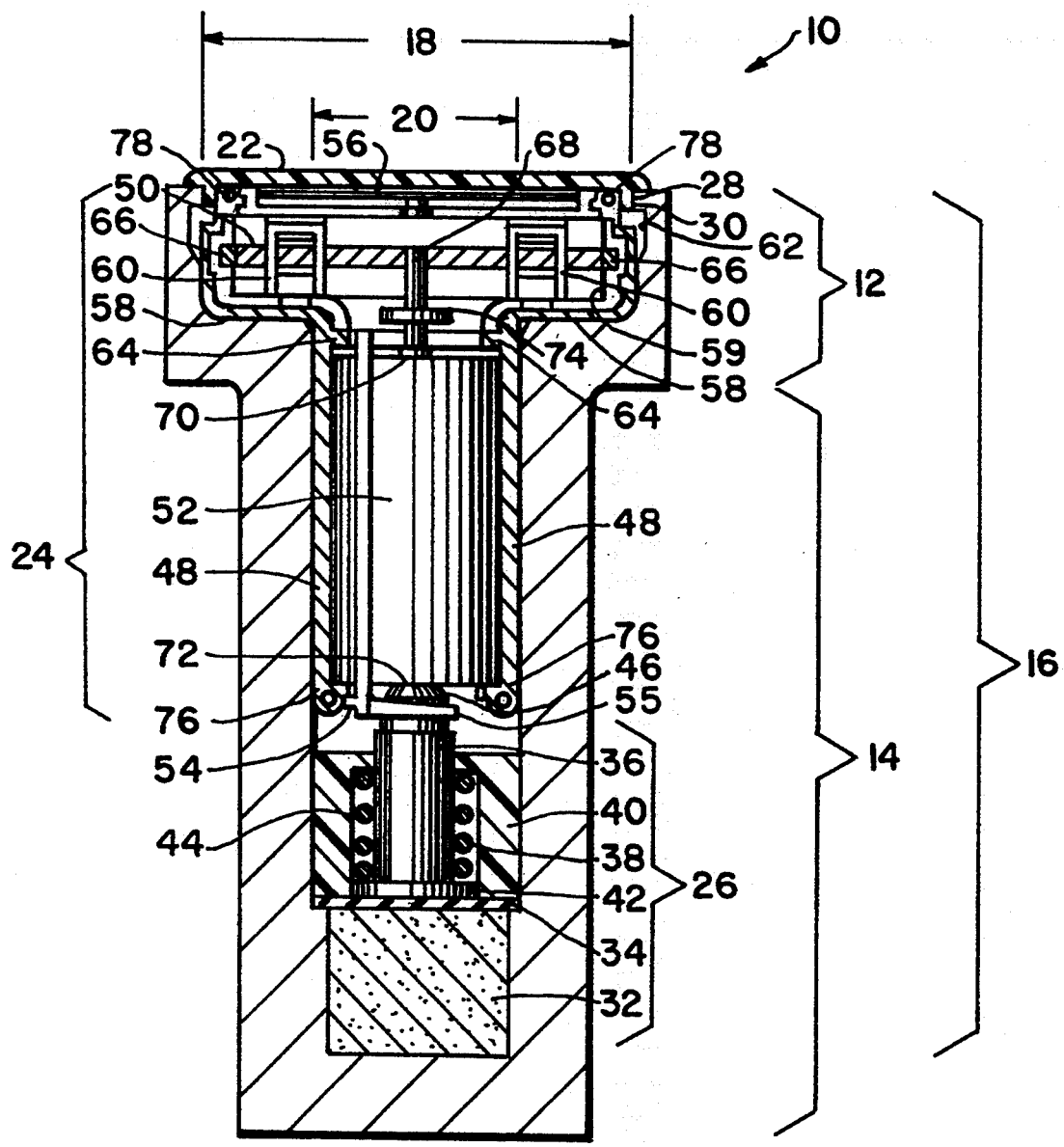
FIG. 1 is a vertical cross-sectional view of the preferred embodiment of the present invention during its inactive state.

Referring to the figures and, in particular, FIG. 1, there is shown a preferred embodiment of the thermal sensor in the form of a modified bolt in an upright position, generally represented by reference numeral 10. Unless otherwise noted, locational references to the elements of present invention, such as top, bottom, upper or lower, should be identified with the upright position of the present invention, as shown in FIG. 1. The sensor 10 has a hexagonal head portion 12 at the top which is larger in diameter than the rest of the sensor underneath, hereinafter referred to as the body portion 14. The outer regions of the head and body portions of the sensor resemble a standard bolt, and allows the sensor to easily substitute for a standard axle cap bolt of any bearing assembly.

A bore 16 is created within the inner regions of both the head 12 and body portions 14 of the sensor, such that the diameter 18 of the bore within the head portion is larger than its diameter 20 within the body portion. However, the dimensions of the bore 16 are only important in as far as there is ample room within the sensor 10 to accommodate the inner elements of the present invention. The larger region created within the head portion 12 of the sensor has many useful features and provides plenty of room for some of the key elements described below.

In the preferred embodiment of the present invention, the outer dimensions of the bolt may vary, so long as they are the same as a standard axle cap bolt. For example, a standard bolt, and thus one used in a preferred embodiment of the present invention, may have a length of approximately 3 inches (7.5 cm) wherein the head portion has a length of ⅝ of an inch (1.59 cm). The diameter varies throughout the length of a standard bolt such that the head portion diameter from side to side is 1⅝ inches (4.13 cm) and from corner to corner is 1⅞ inches (4.76 cm), and the body portion diameter including the threads of the bolt is approximately 1 inch (2.54 cm). The sensor 10 has these dimensions, though not limited to these dimensions, to accommodate all the elements of the present invention.

A sealing cap 22 is attached to the upper, open end of the sensor in order to contain and protect a circuitry housing assembly 24 and a motor assembly 26 within the bore 16 of the present invention. In the preferred embodiment, the circumferential diameter of the cap is large than the diameter 18 of the open end of the sensor. To position the cap over the open end so that the open end is completely covered, a circumferential abutment 28 on the bottom side of the cap sets within the inner surface 30 of the top head portion 12 of the sensor. An adhesive sealant or foam tape (not shown) is provided on the under side of the circumference of the cap and the outer surface of the circumferential abutment in order to securely fasten the cap to the top of the sensor 10.

As shown in FIG. 1, the motor assembly 26 is located at the bottom part of the bore 16 and comprises a means 32 for detecting a predetermined temperature, a diaphragm 34, a piston 36, a compression spring 38 and a retainer 40. The lower part of the motor assembly 26 includes the means 32 for detecting a predetermined temperature, such as a wax motor, surrounded on three sides by the bottom portion of the sensor and by the diaphragm 34 from above. At this location, the detecting means 32 is positioned to sense any change in temperature that the bottom region of the sensor may experience.

When the temperature of the bottom region reaches a predetermined minimum level, such as 250° to 350° F., the detecting means 32 expands and exerts a force upon the its surrounding area. The temperature range of the detecting means is determined by the formulation of its material composition. For a wax motor, the formulation of the included wax will determine its expansion rate and temperature.

The retainer 40 is a cylindrical metal element that is situated on the diaphragm 34, having a hollow shaft that guides the piston 36 to move in a linear direction towards the head portion 12 of the sensor 10. A piston flange 42 at the bottom of the piston 36 is held down to the diaphragm 34 by the compression spring 38 so that the piston is always in contact with the diaphragm but may move in relation to the retainer 40. The other end of the compression spring is support by an upper lip 44 of the retainer 40, which also functions to guide the upper portion of the piston 36 to move in a linear direction in coordination with the piston flange 42 that is adjacent to the hollow shaft.

The means 32 for detecting a predetermined temperature, diaphragm 34, piston 36, compression spring 38 and retainer 40 of the motor assembly 26 should be made a material that can withstand high temperature, especially the maximum temperature attainable by a bearing assembly of a railroad car. In addition, an upper tapered end 46 of the piston 36 must be made of or coated with a conductive material. The diaphragm 34 should preferably be made of a material that is heat resistant, flexible and stretchable material by the detecting means 32 when the predetermined temperature is reached.

Figure 2:
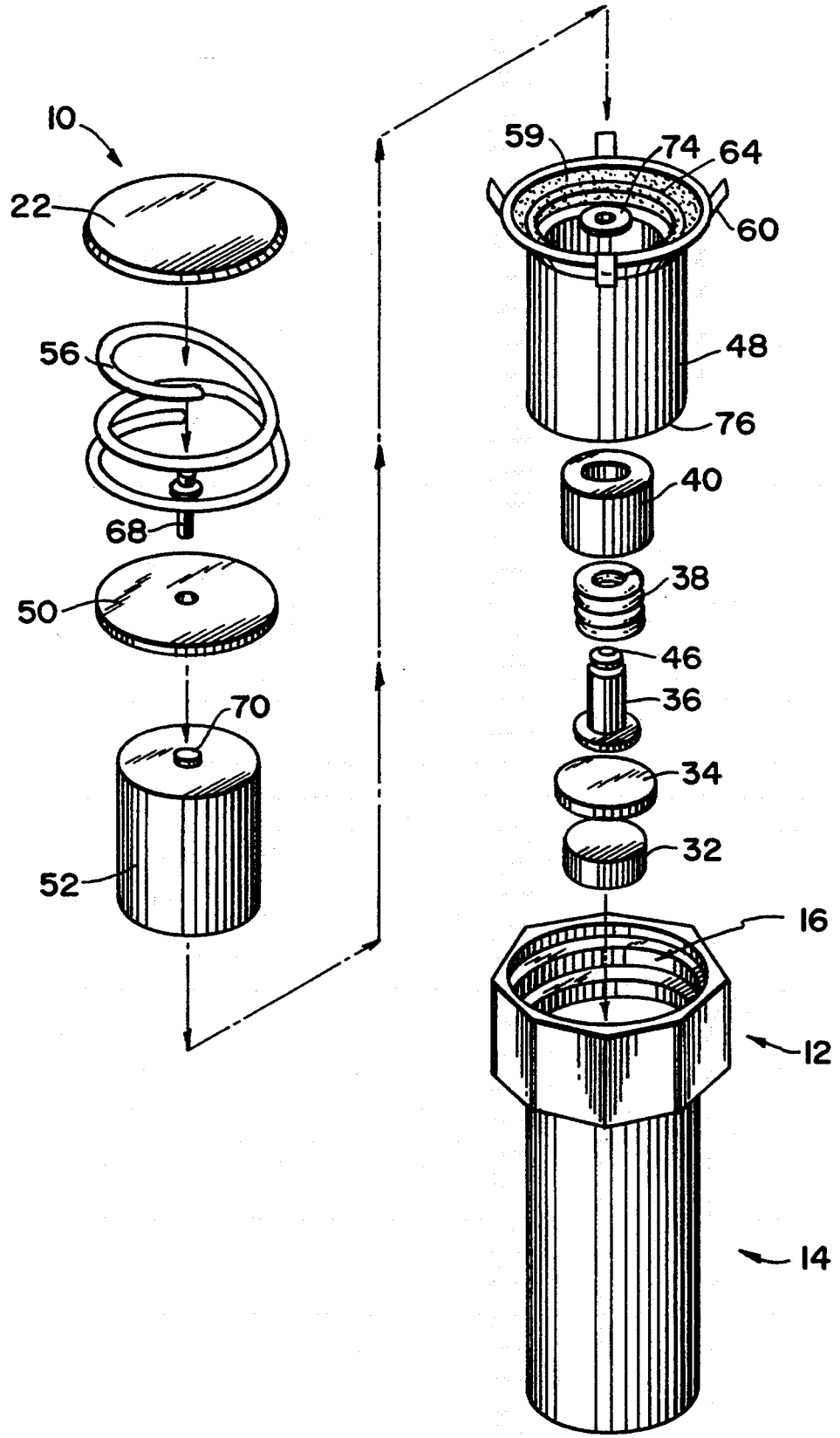
FIG. 2 is an exploded view of the preferred embodiment of FIG. 1.

Now referring to both FIGS. 1 and 2, the circuitry housing assembly 24 of the preferred embodiment is a communication system that comprises a housing 48, a transmitter circuit 50, an energy source 52, a switch mechanism 54 and an antenna 56. The housing 48 has a mushroom-like outer structure that is fabricated to conform with the bore 16 of the sensor 10. The dimensions of the assembly 24 are such that the housing 48 may vertically slide a predetermined distance up and down the bore 16. The assembly 24 is adjacent to and above the motor assembly 26 but does not come in contact with the motor assembly 26 due to a preventive shoulder 58 within the head portion 12 of the sensor 10. Tabs 60 along the upper portion of the assembly 24 hinder the upward movement of the assembly by hooking to a circumferential groove 62 made in the bore 16 at the head portion 12 of the sensor 10. Although the assembly 24 may be removed from the bore 12, a substantial amount of force is required in order to free the tabs 60 from the groove 62.

The housing 48 is a molded interconnect device that houses the transmitter circuit 50 and the energy source 52, such as a battery. The housing 48 may be made of any type of moldable material, but preferably, should have heat insulating properties. For the preferred embodiment, the housing 48 may consist of two halves molded so that they may be snapped together using a pin-and-socket snap fit. This configuration allows any person to access the transmitter circuit 50 and energy source 52 housed by the housing 48.

The housing 48 has molded partitions 64 which are used to retain the battery and transmitter circuit in two different compartments. The upper compartment of the housing 48 retains the transmitter circuit 50 within a circumferential inner groove 66 and has a height that is tall enough to accommodate a circuit board and various electronic components soldered to the upper and lower surfaces of the circuit board (not shown). The transmitter circuit 50 is capable of generating a predetermined frequency or frequency pattern. In the preferred embodiment, the transmitter circuit is a 915 MHz spread spectrum transmitter on a round circuit board with ground connections running along the edges. The transmitter circuit includes a oscillator, modulator and other electronic components necessary to generate a signal frequency.

A spring-loaded contact pin 68 is accepted through a hole in the center of the transmitter circuit 50 and soldered to the transmitter circuit, thus providing the transmitter circuit a connection to the anode 70 of the energy source in the form of a battery 52. The contact pin 68 has a gold flashed surface that securely contacts the anode 70 of the battery 52. A spring-loaded mechanism (not shown) within the contact pin 68 adjustably adapts the bottom of the contact pin to the top surface of the battery. For additional support, the contact pin 68 rests on an extension 74 of the housing between the transmitter circuit and the battery.

The lower compartment of the housing retains the battery 52. The inner wall of the lower compartment clamps around the outer wall of the battery 52 and battery shoulders at the top, a.k.a. partitions 64, and bottom 76 of the lower compartment bind the battery therein. The battery shoulders 64 and 76 only support the rims of the battery so that the anode 70 and cathode 72 of the battery 52 are accessible to other elements of the sensor 10, such as the contact pin 68 and the piston 36.

A preferred battery of the present invention is a 6 volt Lithium cell battery having a mylar jacket to insulate the cathode from the housing. The size of the battery is approximately the same as a standard AA size battery, except that the longitudinal length of the battery is approximately half as long.

The housing 48 has a built-in switch mechanism 54 at the bottom that is used to close the transmitter circuit 50 in order to generate the predetermined warning signal. The switch mechanism 54 includes an arm 55 which should be stationary relative to the housing 48 and yet be slightly flexible to any upward force from the piston 36. The switch mechanism 54 is electrically connected by conductive runs (not shown) to the grounding portion of the transmitter circuit 50 in order to provide an RF ground.

Preferably, the switch mechanism 54 connects to a portion 59 of the molded housing 48 that is coated with a highly conductive material. Thus, the switch mechanism 54 is inexpensive to assemble and yet benefits from the heat insulating properties of the plastic housing material. The highly conductive portion 59 is continuously coated in a narrow strip along the inner surface of the lower compartment from the switch arm 55 to the inner surface of the upper compartment. The highly conductive material may be coated onto the entire inner surface of the upper compartment, including the circumferential inner groove 62 that retains the transmitter circuit 50, in order to provide an RF ground.

The antenna 56 is a wire helix that is soldered to the transmitter circuit 50 and is compressed into the space between the top of the housing 48 and the sealing cap 22. There is a hole in the top of the housing 48 that allows the antenna 56 to pass through.

At any given time, the present invention may be in one of two different states: an inactive state and an active state. During the inactive state, the present invention has not detected that a predetermined minimum temperature has been reached in the bearing assembly, and thus, the cap remains closed and a signal frequency is not generated, as shown in FIG. 1. The present invention goes into an active state when the predetermined minimum temperature has been reached. At that time, the cap is moved away from the head portion of the sensor and a warning signal is transmitted, as shown in FIG. 3.

Figure 3:
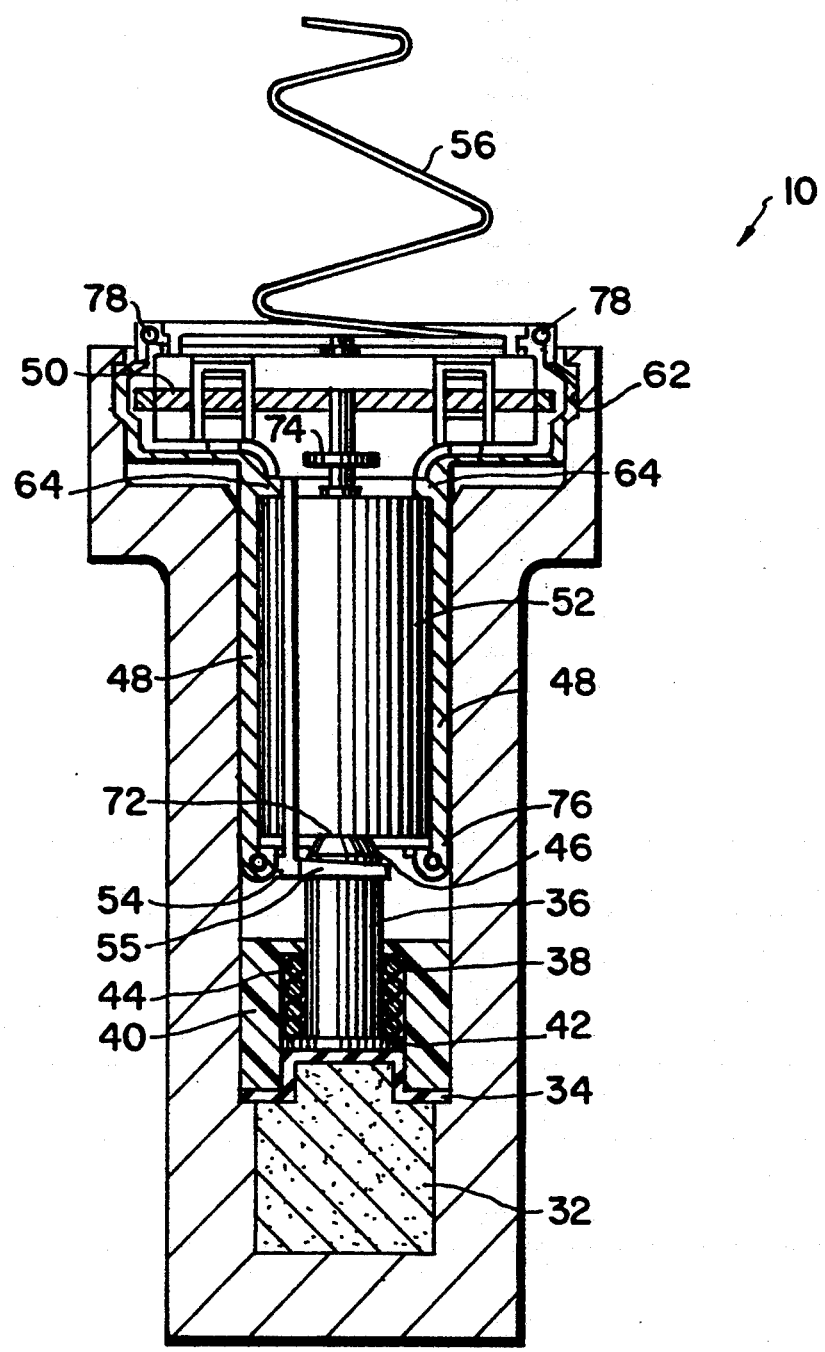
FIG. 3 is a vertical cross-sectional view of the preferred embodiment of the present invention during its active state.

Referring to FIG. 3, the operation of the sensor 10 is as follows. As stated above, the detecting means 32 of the motor assembly 26 expands when its temperature reaches a predetermined minimum value and applies pressure to its surround area. Since the diaphragm 34 is more flexible than the other elements surrounding the detecting means 32, i.e., the bottom portion of the sensor, the expansion of the detecting means will apply pressure to the bottom side of the piston 36, forcing the diaphragm upward towards the head portion 12 of the sensor 10.

As the piston 36 moves linearly upward towards the head portion 12, it will eventually come in contact with the cathode 72 of the battery 52. Thereafter, any additional force applied to the cathode 72 by the piston 36 will force the battery 52 to abut against the molded partitions or upper battery shoulders 64 and cause the entire housing 48 to move upward relative to the sensor 10. As a result, the upper rim 78 of the housing 48 shall apply enough force against the sealing cap 22 in order to overcome the adhesive bond holding the sealing cap to the top of the sensor 10 and clear the sealing cap away therefrom.

As soon as the sealing cap is moved away from the top of the head portion 12, the antenna 56 becomes free to extend from the top of the sensor 10. Thus, the antenna 56 is no longer compressed in the space between the top of the housing 48 and the sealing cap 22 and may extend clear of the head and body portions 12 and 14 of the thermal sensor 10. This positioning of the antenna 56 minimizes the interference of a frequency generated through the antenna by the head and body portions 12 and 14 of the thermal sensor 10.

At the general, approximate moment that the piston 36 comes in contact with the cathode 72 of the battery 52, the piston also comes in contact with the switch mechanism 54. During the inactive state of the sensor 10, the switch mechanism 54 is situated above the piston 36 so that it comes around the outer perimeter of the upper tapered end 46 without touching the piston. When the sensor 10 goes into its active state, a lower portion of the upper tapered end 46 having a larger diameter comes in contact with the switch mechanism 54. Thus, the upper tapered end 46 of the piston 36 completes the circuit between the switch mechanism 54 and the cathode 72 of the battery 52, and feeds power from the battery to the transmitter circuit 50.

Finally, after receiving power from the battery 52, the modulator and oscillator (not shown) of the transmitter circuit 50 generate a signal of a predetermined frequency or frequency pattern and sends the signal through the antenna 56. Being free from the head portion 12 of the sensor 10, the antenna 56 is able to transmit the signal to any receiver (not shown) within the transmitting range of the transmitter circuit 50. Such a receiver may be located in one of the railroad cars, such as the locomotive, or in a nearby train depot. The receiver would quickly notify a railroad train crew member or employee of a potential bearing failure as soon as a high temperature is detected by the sensor 10 of the present invention.

Of course, the upper surface of the housing 48 may be brightly colored or reflective in order to provide a highly visible indication that high temperatures have been reached to those people who do not have access to such a receiver.

Referring back again to the motor assembly 26, the compression spring 38 applies a nominal force, for example ½ to 1 lb. of force, to the flange 42 of the piston 36. Although this force is not great enough to significantly hinder the detecting means from sliding the piston within the retainer's shaft, the force is sufficient to keep the piston from moving unnecessarily. Since the sensor 10 of the present invention is designed to be used in a harsh environment where sudden lurches are common, the nominal force to the piston flange 42 is necessary to prevent the piston 36 from touching the battery 52 or the switch mechanism 54 accidentally.

Thus, it will be appreciated that the present invention is a combination of a frequency generating circuit and a cap-freeing mechanism in a thermal warning sensor that are both responsive to a detection of a predetermined minimum temperature. The cap-freeing mechanism transfers a longitudinal force from the piston 36 to the cap 22, thereby freeing the cap from the head portion 12 of the sensor 10 and allowing the antenna 56 to extend out of the head portion. The frequency generating circuit 50 is activated by a connection made between the switch mechanism 54 and the cathode 72 of the battery 52 due to the upward movement of the piston 36. Upon becoming activated, the frequency generating circuit 50 sends a predetermined frequency or frequency pattern to the antenna 56 from which it is redirected to a suitable receiver at a way station or locomotive cab.

In operation, the warning device or sensor 10 is used to indicate when a rolling bearing for a train wheel has reached a certain threshold temperature. Typically, three bolts are used to attach an end cap of a bearing to an axle hub, and the sensor 10 of the present invention may substitute for one or more of these bolts. This positions the sensor 10 in a direct heat conduction path with the inner ring of the bearing such that bottom end of the sensor is closest to the highest temperature area of the bearing. In addition, the head portion 12 of sensor 10 is furthest away from the highest temperature area of the bearing and is exposed to the open air outside the bearing assembly. Therefore, bottom end of the sensor 10 is the most temperature sensitive whereas the head portion 12 remains cooler than the rest 14 of the sensor.

For this reason, the detecting means 32 is ideally located at the lowermost region of the body portion of sensor. Being closest to the highest temperature are of the bearing, the detecting means 32 is able to monitor the temperature of the bearing assembly with a reasonable amount of accuracy.

Also, the transmitter circuit 50 is ideally located in the head portion 12 of the sensor 10. Due to the transmitter circuit's 50 sensitivity to extreme heat levels, the transmitter circuit is situated at the coolest portion of the sensor 10. The battery 52 is less susceptible to heat and, therefore, is situated in the middle of the sensor 10 to insulate the transmitter circuit 50 from the hotter end of the sensor 10. In addition, the housing 48 comprises a heat insulating material and surrounds the transmitter circuit 50 and the battery 52 to provide further heat insulation from the hotter end of the sensor 10. Thus, the location of the transmitter circuit 50, the location of the battery 52, and the location and composition of the housing 48 work in combination in order to ensure the proper and reliable operation of the transmitter circuit.

The invention having been thus described with particular reference to the preferred forms thereof, it will be obvious that various changes and modifications may be made therein without departing from the spirit and scope of the invention as defined in the appended claims.

We claim:

1. A thermal sensor for detection of bearing failures comprising:
    a bolt having a head at one end and having a second end, said bolt having a bore extending through said head to a point adjacent said second end;
    a piston situated in said bore;
    a communication system enclosed within said bore, said system including a transmitter circuit, an antenna and an energy source;
    a housing enclosing said energy source, said energy source being disposed between said transmitter circuit and said piston; and
    means, responsive to an elevated temperature indicative of bearing failure, for moving said piston towards said head of said bolt such that said antenna protrudes from said head of said bolt and said communication system is turned on.

2. The thermal sensor of claim 1, in which said housing comprises a plastic material that is heat resistant.

3. The thermal sensor of claim 1, in which said housing includes means for connecting one end of said energy source to said transmitter circuit, said housing also enclosing said transmitter circuit of said communication system.

4. The thermal sensor of claim 1, wherein said antenna has a helical shape which allows it to be compressed substantially within said head of said bolt.

5. The thermal sensor of claim 1, further comprising a cap removably attached to said head of said bolt, whereby said cap retains said antenna above said housing within said head until means for moving said piston causes said cap to move away from said head.

6. The thermal sensor of claim 5, in which said piston moves said housing such that said housing contacts said cap, thereby forcing said cap to move away from said head of said bolt.

7. The thermal sensor of claim 1, wherein said energy source provides energy to said transmitter circuit when said means for moving said piston detects said elevated temperature.

8. The thermal sensor of claim 1, wherein said means for moving said piston is a wax motor.

9. A thermal sensor for detection of bearing failures comprising:
- a bolt having a head at one end and having a second end, said bolt having a bore extending through said head to a point adjacent said second end;
- a piston situated in said bore;
- a communication system enclosed within said bore, said system including a transmitter circuit, an antenna, and an energy source having one end;
- a switch arm adjacent said energy source; and
- means, responsive to an elevated temperature indicative of bearing failure, for moving said piston towards the head of said bolt such that said antenna protrudes from said one end of said bolt,
- said means for moving said piston also causing one end of said piston to contact both said one end of said energy source and said switch arm so as to connect said energy source to said transmitter circuit, thereby turning one said communication system.

10. The thermal sensor of claim 9, further comprising a housing enclosing said energy source.

11. The thermal sensor of claim 9, wherein said antenna has a helical shape which allows it to be compressed substantially within said head of said bolt.

12. The thermal sensor of claim 9, further comprising a cap removably attached to said head of said bolt, whereby said cap retains said antenna above said housing within said head until said means for moving said piston causes said cap to move away form said head.

13. The thermal sensor of claim 12, wherein said piston moves said housing such that said housing contacts said cap, thereby forcing said cap to move away from said head of said bolt.

14. The thermal sensor of claim 9, wherein said energy source provides energy to said transmitter circuit when said means for moving said piston detects said elevated temperature.

15. The thermal sensor of claim 9, wherein said means for moving said piston is a wax motor.

* * * * *